(12) United States Patent
Diggle, III et al.

(10) Patent No.: US 6,936,762 B2
(45) Date of Patent: Aug. 30, 2005

(54) CABLE PROTECTOR

(75) Inventors: Frederick James Diggle, III, Birmingham, AL (US); Jacob P. Jackson, Cullman, AL (US)

(73) Assignee: BellSouth Intellectual Property Corporation, Atlanta, GA (US)

( * ) Notice: Subject to any disclaimer, the term of this patent is extended or adjusted under 35 U.S.C. 154(b) by 0 days.

(21) Appl. No.: 10/726,756

(22) Filed: Dec. 3, 2003

(65) Prior Publication Data

US 2005/0121211 A1  Jun. 9, 2005

(51) Int. Cl.$^7$ .............................................. H02G 15/24
(52) U.S. Cl. .................................................. 174/21 R
(58) Field of Search .......................... 174/21 R, 21 JS, 174/21 JR, 84 R

(56) References Cited

U.S. PATENT DOCUMENTS

| | | | | |
|---|---|---|---|---|
| 1,000,043 | A | * | 8/1911 | Scism ......................... 285/404 |
| 3,708,864 | A | * | 1/1973 | Patel .......................... 228/154 |
| 4,719,315 | A | * | 1/1988 | Gregorac .................... 174/73.1 |
| 5,654,526 | A | * | 8/1997 | Sharp ......................... 174/84 R |
| 5,661,263 | A | * | 8/1997 | Salvaggio .................... 174/48 |
| 5,713,700 | A | * | 2/1998 | Vogelsang ................ 405/183.5 |
| 6,173,721 | B1 | | 1/2001 | Mery |
| 6,548,760 | B1 | * | 4/2003 | Stout, Jr. ................... 174/65 R |
| 2003/0230343 | A1 | * | 12/2003 | Phipps ........................ 137/364 |

OTHER PUBLICATIONS

U.S. Appl. No. 10/706,716 filed Nov. 12, 2003.
"Contractor Enclosures and Wireway," Hoffman Enclosures, Inc. catalog, 2001, pp. 2, 20-23, 26-35, available on Feb. 18, 2004 at http://www.hoffmanonline.com/PDFCatalog/Commercial/index.htm.
"E.M.T. Set-Screw Connectors," Iberville Products catalog, pp. 17-22, Thomas & Betts, available on Feb. 18, 2004 at http://www.tnb-canada.com/catalogues/pdf/en/iberville_roughing_in/roughing_01g_eng.pdf.
"EMT Fittings," Arlington Industries Inc. catalog, Jul. 23, 2002, available on Feb. 18, 2004 at http://www.aifittings.com/b_2.htm.
"Glossary of Electrical Industry Terms," available on Feb. 18, 2004 at http://www.hub24x7.com/wiring/raco_bell/pdf/glossary.pdf.
"Lightguide Fiber Optic Protection System," Norfolk Wire & Electronics catalog, 2002, available on Feb. 18, 2004 at http://www.connectworld.net/bulkcable/routingraceway2.html.
"Technical Information," Dynamic Coatings, Inc. technical information, available on Feb. 18, 2004 at http://www.dynamiccoatingsinc.com/technical.htm.
Knisley, J., "Selecting Wire and Cable Management Systems," Electrical Construction and Maintenance, Mar. 1, 2003, available at http://ecmweb.com/ar/electric_selecting_wire_cable/index.htm.

* cited by examiner

Primary Examiner—Chau N. Nguyen
(74) Attorney, Agent, or Firm—Lee & Hayes, PLLC

(57) ABSTRACT

A device for installing a cable into a raceway member is disclosed. The device includes an elongate member having a first end portion and a second end portion adjacent to the first end portion. The second end portion is adapted to removably engage the raceway member. The elongate member defines an axial passageway for receiving the cable therethough and has a predetermined cross-sectional geometry in a plane perpendicular to the axial passageway.

21 Claims, 7 Drawing Sheets

CABLE PROTECTOR

TECHNICAL FIELD

The present invention is directed generally and in various embodiments to a device for installing a cable into a raceway, and more particularly, to a device for reducing physical damage to the cable while being pulled into the raceway.

BACKGROUND

The use of raceways to organize and protect communication and electrical power cables in data, voice, and power systems is a commonly observed practice, particularly for those applications where cable damage might otherwise result from inadvertent mechanical force or moisture. The protective features afforded by these systems notwithstanding, successfully installing cables into a raceway system is a challenging task requiring considerable expertise. In the most common scenario in which several cables are to be installed into a single raceway, the combined efforts of at least two technicians are typically required. A first technician positioned at the raceway outlet uses a "fish tape" to pull the cables into the raceway, while a second technician located at the raceway inlet simultaneously guides the cables into the raceway by hand to ensure their uniform entry. The role of the second technician is two-fold. First, by manually guiding the cables into the raceway, the frictional forces encountered by the cables at the raceway inlet are reduced, thereby reducing the pulling effort necessary for cable installation. Second, and perhaps most importantly, manually guiding the conductors into the raceway reduces the chance of tears in the cable insulation or jacketing that expose the cable conductor, commonly referred to as "bare nicks."

Bare nicks often result in low and high resistance grounds or short circuits in the case of electrical conductors or unacceptable attenuation of optical signals in the case of optical conductors. Even when the technicians are experienced, bare nicks may be unavoidable, occurring approximately once in every one hundred cable pulls. Although the incidence of bare nicks is relatively small, it nonetheless proves to be a costly problem for businesses such as telecommunication providers that install and maintain complex electrical power and communication systems comprising thousands of cables.

One approach that may be used to address the problem of bare nicks is simply to allocate spare cables during the design phase of the electrical power or communication system. If a bare nick is discovered, the defective cable may be taken out of service and replaced with a spare. This approach, however, may increase the installation cost in terms of the cable required and the increased raceway capacity necessary to accommodate it, e.g., where cable lengths are large. Moreover, because the symptoms associated with a bare nick may be sporadic, detecting the problem and identifying its source further increases the costs associated with system maintenance and down time.

A second approach is the use of raceway components having built-in features designed to reduce the occurrence of bare nicks. Conduit connectors that serve as cable entries into raceway systems, for example, are widely available with an insulated throat feature. Typically consisting of a thermoplastic insert glued or pressed into the throat of the connector, the insulated throat is intended to reduce cable abrasion by providing a barrier between the cable and the connector housing as the cable is pulled into the connector. Despite this protective feature, a conduit connector with an insulated throat may be costly than its standard counterpart, further increasing system installation costs.

SUMMARY

This application discloses a device for installing a cable into a raceway member. According to various embodiments, the device includes an elongate member having a first end portion and a second end portion adjacent to the first end portion. The second end portion is adapted to removably engage the raceway member. The elongate member defines an axial passageway for receiving the cable therethough and has a predetermined cross-sectional geometry in a plane perpendicular to the axial passageway.

According to various embodiments, the device includes an elongate member defining an axial passageway for receiving cable therethough. The axial passageway has a predetermined cross-sectional geometry in a plane perpendicular to the axial passageway. The elongated member also includes a first end portion and a second end portion adjacent to the first end portion. The second end portion is adapted to removably engage the raceway member. The cross-sectional geometry of the axial passageway through the first end portion increases in area in a direction way from the second end portion.

According to various embodiments, the device includes an elongate member having a first end portion and a second end portion adjacent to the first end portion. The second end portion includes means for removably engaging a raceway member. The elongate member includes means for receiving a cable therethrough.

Other systems, methods, and/or devices according to embodiments will be or become apparent to one with skill in the art upon review of the following drawings and detailed description. It is intended that all such additional systems, methods, and/or devices be included within this description, be within the scope of the present invention, and be protected by the accompanying claims.

BRIEF DESCRIPTION OF THE FIGURES

The present disclosure will be described in conjunction with the following figures, wherein.

DETAILED DESCRIPTION

Figure 1:
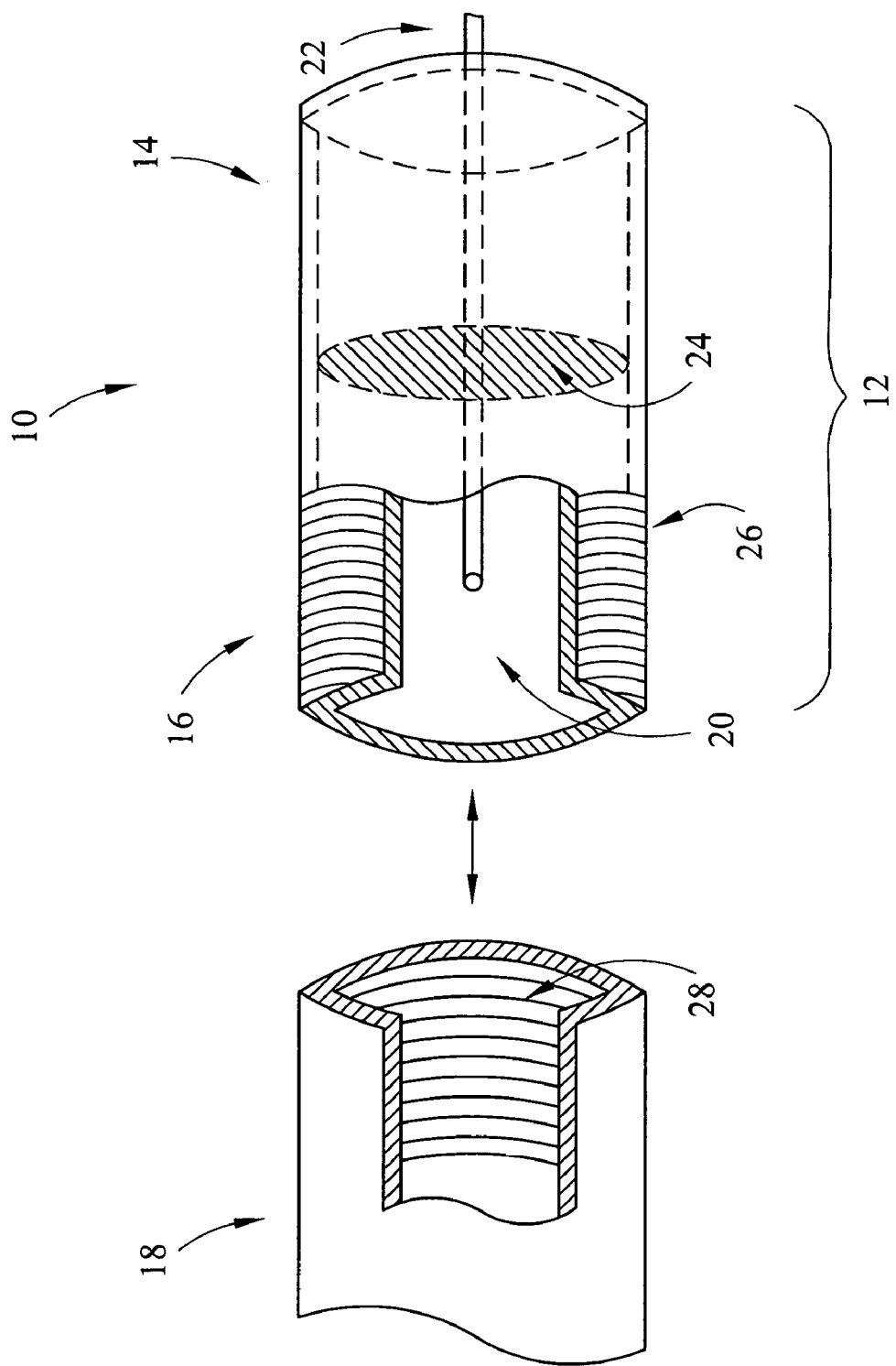
FIG. 1 illustrates a cable protector according to various embodiments.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity.

As used herein, the term "raceway" means any enclosed channel designed for holding cables, such as for example, a conduit or a wireway. The term "cable" as used herein means a single insulated conductor, or a group of conductors insulated from each other and forming a stranded assembly that may be further insulated by outside wrappings, such as, for example, metal wire (e.g., copper wire), telephone line, fiber optic cable, telecommunications cable, electrical transmission/distribution lines, lines for promoting support of elevated structures (e.g., guide wires), etc. Signals carried by a cable may include electrical signals and optical signals.

FIG. 1 depicts various embodiments of a cable protector 10 for use by a technician (not shown) to reduce abrasion to the insulation of, for example, a cable 22 during entry of the cable 22 into a raceway member 18. The raceway member 18 of FIG. 1 is depicted as a standard electrical metallic tubing (EMT) conduit fitting commonly available from a variety of EMT manufacturers such as, for example, Thomas & Betts of Memphis, Tenn. As shown in FIG. 1, the cable protector 10 is comprised of an elongate member 12 having a first end portion 14 and a second end portion 16 adjacent to the first end portion 14. The second end portion 16 of the elongate member 12 is adapted to removably engage the raceway member 18. The elongate member 12 defines an axial passageway 20 for receiving the cable 22 therethrough. The axial passageway 20 has a pre-determined cross-sectional geometry 24 in a plane perpendicular to the axial passageway 20.

Although FIG. 1 depicts the axial passageway 20 defined by the elongate member 12 as having a circular cross-sectional geometry 24, the cable protector 10 may be configured in any of a variety of shapes in order to be compatible with the geometry of the particular raceway member 18 into which the cable 22 is to be installed. For example, as shown in FIG. 1, the cable protector 10 may be used with a raceway member 18 having a circular cross-section, such as EMT conduit. In other embodiments, the axial passageway 20 may have a polygonal cross-sectional geometry 24, allowing its use with a raceway member 18 having, for example, a square or rectangular cross-section.

Additionally, for a given cross-sectional geometry 24 of the axial passageway 20, the cable protector 10 may be configured in a variety of sizes in order to be compatible with standard sizes of raceway members 18 having a similar cross-sectional geometry. For example, in the case of a cable protector 10 as shown in FIG. 1 in which the axial passageway 20 has a circular cross-sectional geometry 24, the cable protector 10 may be configured to accommodate standard sizes of EMT conduit fittings, such as ½", ¾", or 1".

Again referring to the embodiments of FIG. 1, the second end portion 16 of the cable protector 10 may comprise a threaded portion 26 for threadingly engaging a threaded portion 28 of opposite gender on the raceway member 18, thereby allowing the cable protector 10 to be removably affixed to the raceway member 18. The threaded portion 26 of the second end portion 16 may be configured with either gender and in any of a variety of standard thread types and sizes in order to be compatible with the thread configurations of standard raceway members 18. In other embodiments (not shown), the second end portion 16 may include a set-screw for providing an alternative means for removably affixing the cable protector 10 to the raceway member 18.

Figure 2:
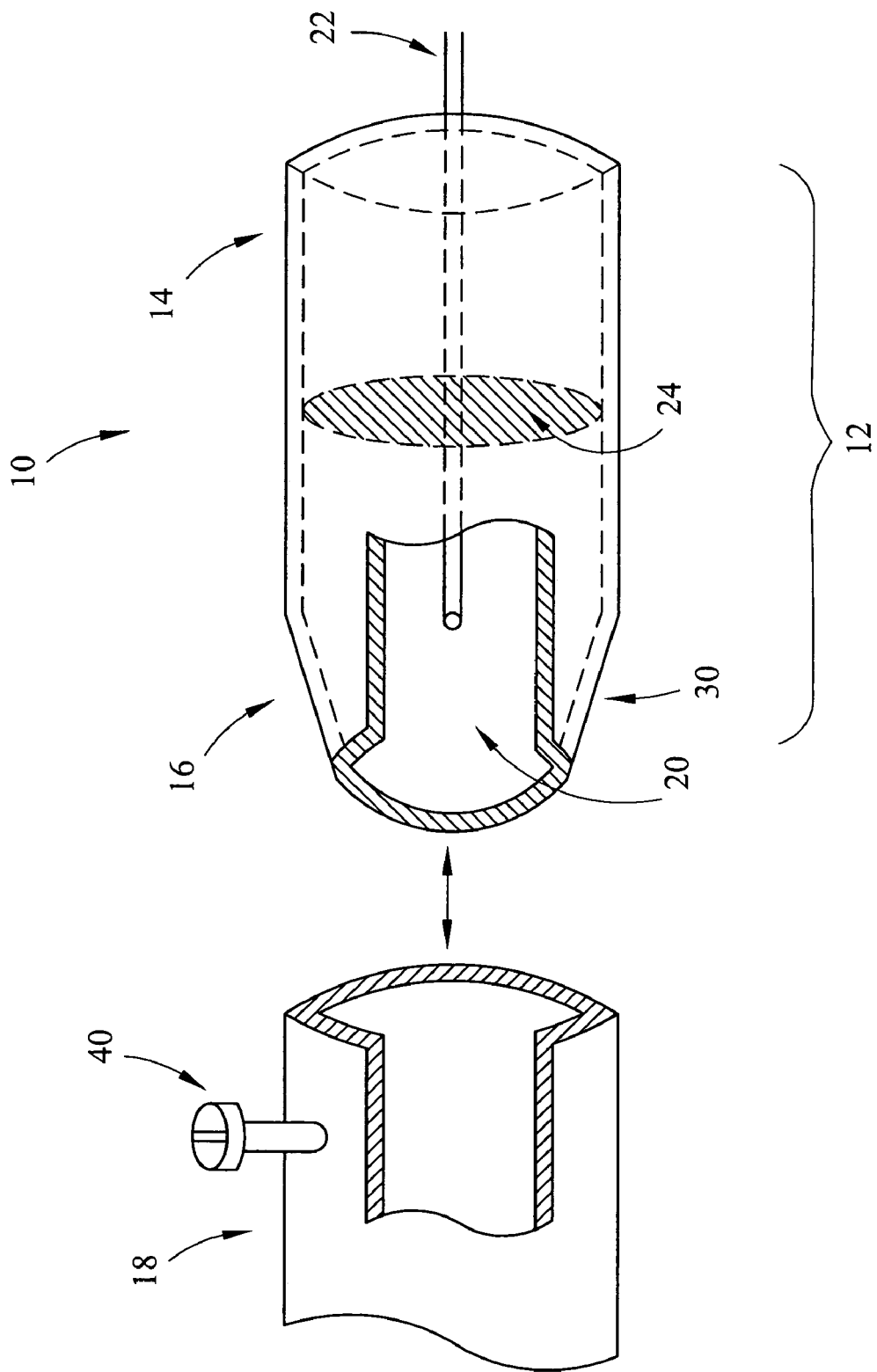
FIG. 2 illustrates a cable protector according to various embodiments.

FIG. 2 depicts various embodiments of the cable protector 10 that may be used where the raceway member 18 has a circular cross-section but is not threadingly configured. The raceway member 18 may be, for example, an EMT set-screw connector having a set-screw 40. As shown in FIG. 2, the second end portion 16 of the cable protector 10 may comprise a tapered portion 30 for frictionally engaging the raceway member 18. The tapered portion 30 is exaggerated for the sake of illustration. Frictional engagement between the tapered portion 30 of the second end portion 16 and the raceway member 18 may be accomplished by inserting the tapered portion 30 into the raceway member 18 so that part of the tapered portion 30 contacts the raceway member 18 with a frictional force sufficient to removably affix the cable protector 10 to the raceway member 18.

Figure 3:
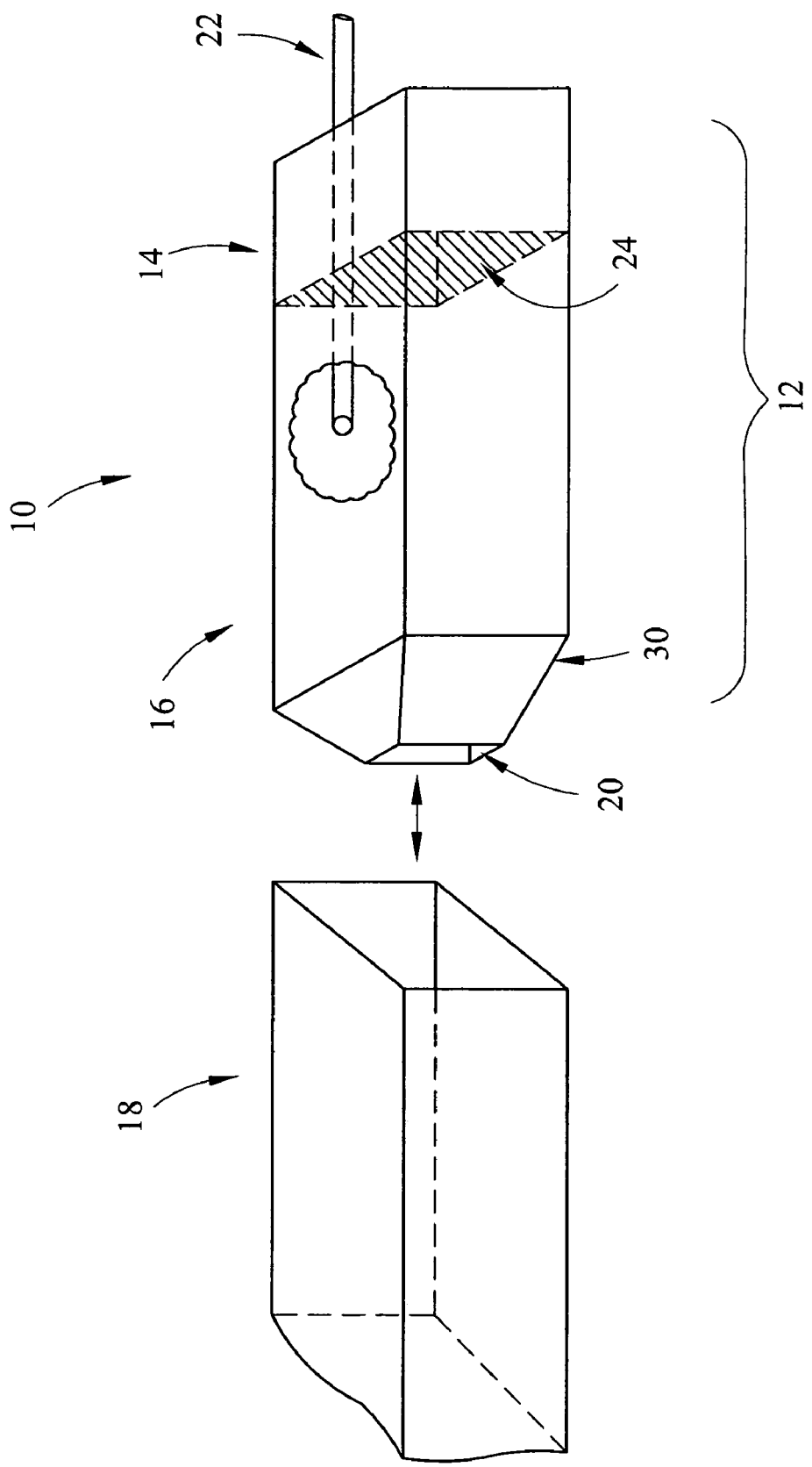
FIG. 3 illustrates a cable protector according to various embodiments.

FIG. 3 depicts various embodiments of the cable protector 10 that are used where the raceway member 18 has a polygonal cross-section. The raceway member 18 may be a wireway commonly available from a variety of manufacturers such as, for example, the Hoffman Corporation of Anoka, Minn. As shown in FIG. 3, the second end portion 16 of the cable protector 10 may comprise a tapered portion 30 for frictionally engaging the raceway member 18. As in FIG. 2, the tapered portion 30 has been exaggerated to clearly illustrate the tapered feature. Frictional engagement between the tapered portion 30 of the second end portion 16 and the raceway member 18 may be accomplished by inserting the tapered portion 30 into the raceway member 18 so that part of the tapered portion 30 contacts the raceway member 18 with a frictional force sufficient to removably affix the cable protector 10 to the raceway member 18. Alternatively, the second end portion 16 may comprise a flared portion (not shown) for frictionally engaging the raceway member 18 that may be slid onto the raceway member 18.

Figure 4A:
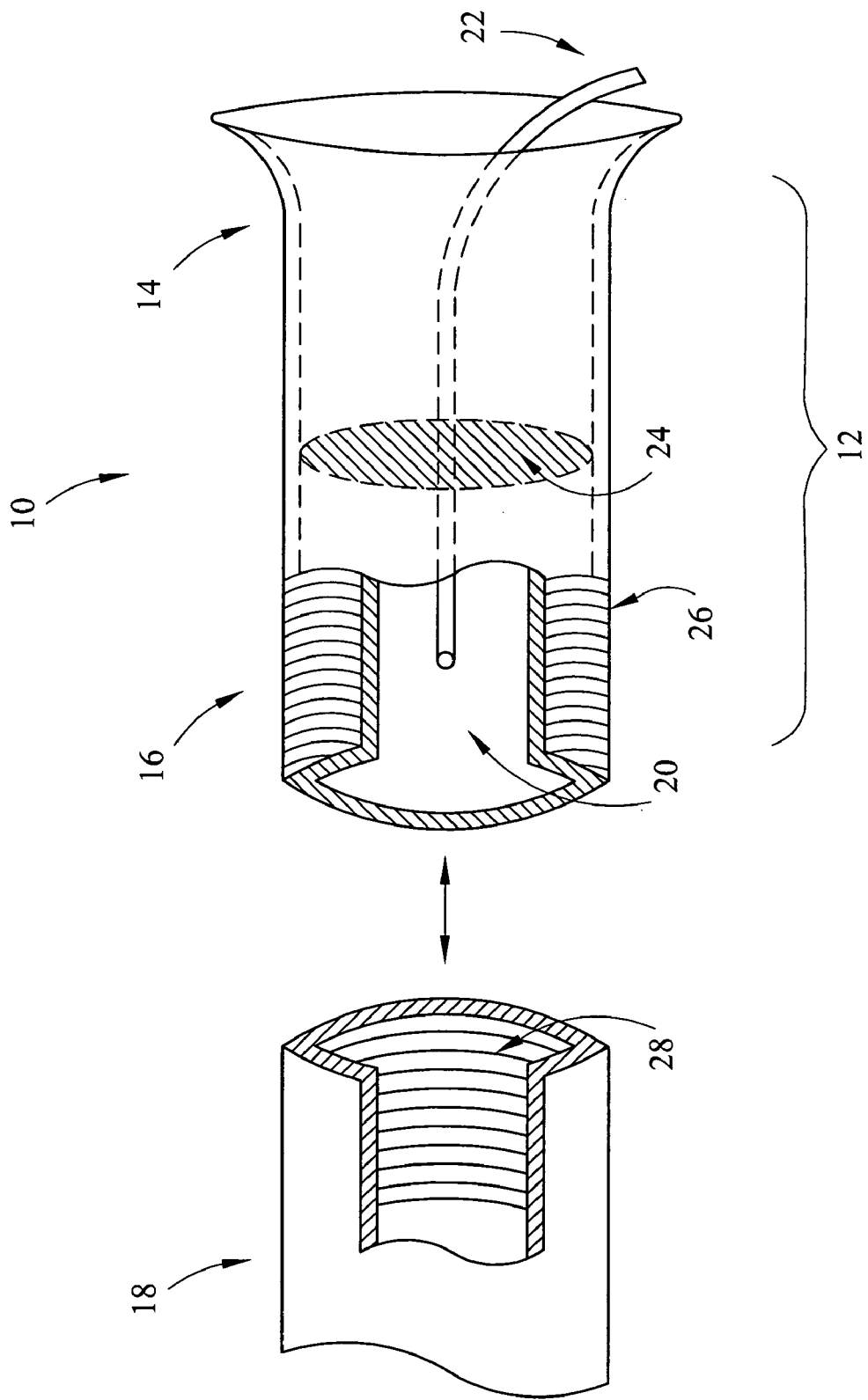
FIGS. 4a and 4b illustrate a cable protector according to various embodiments.
Figure 4B:
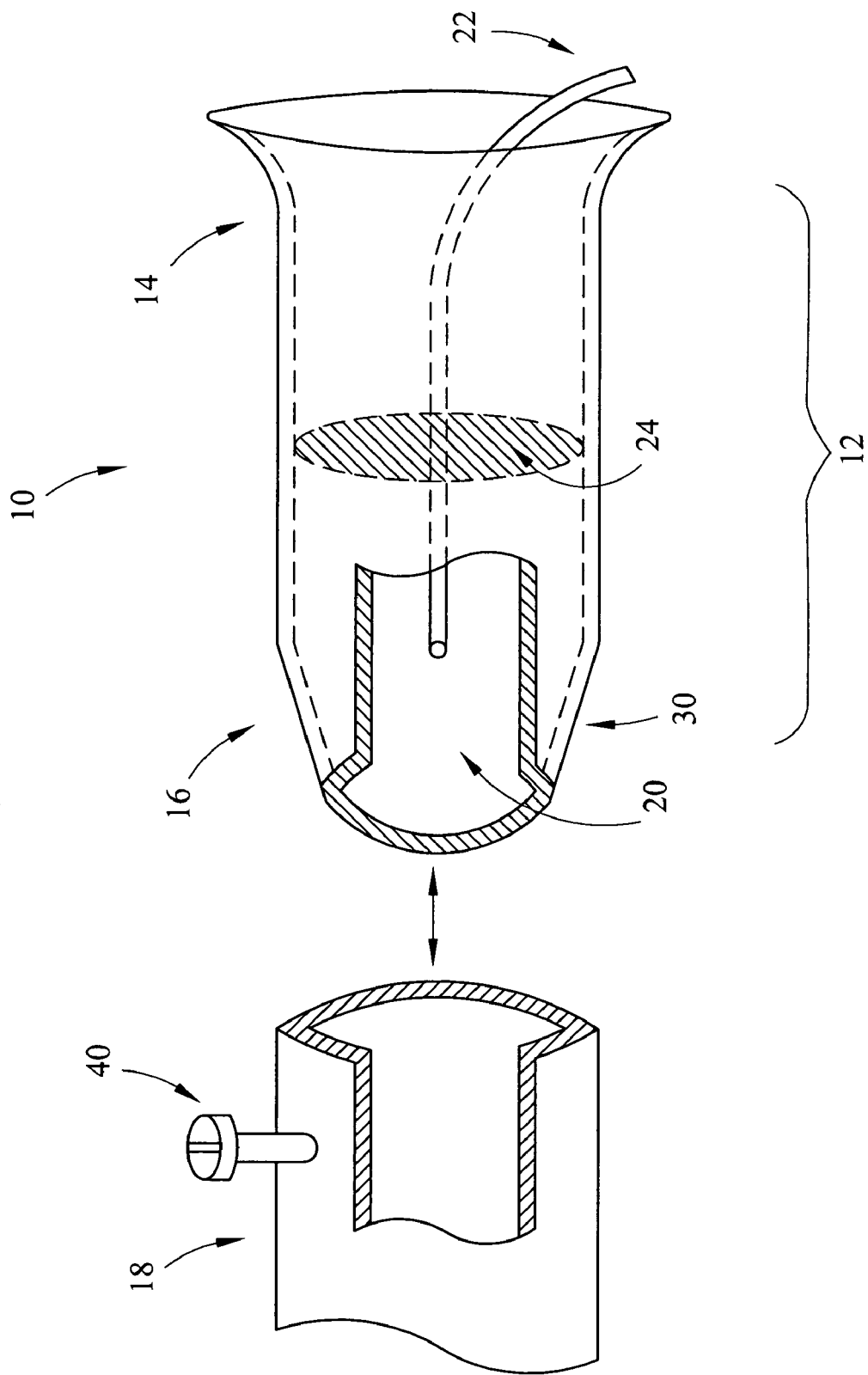
Figure 5:
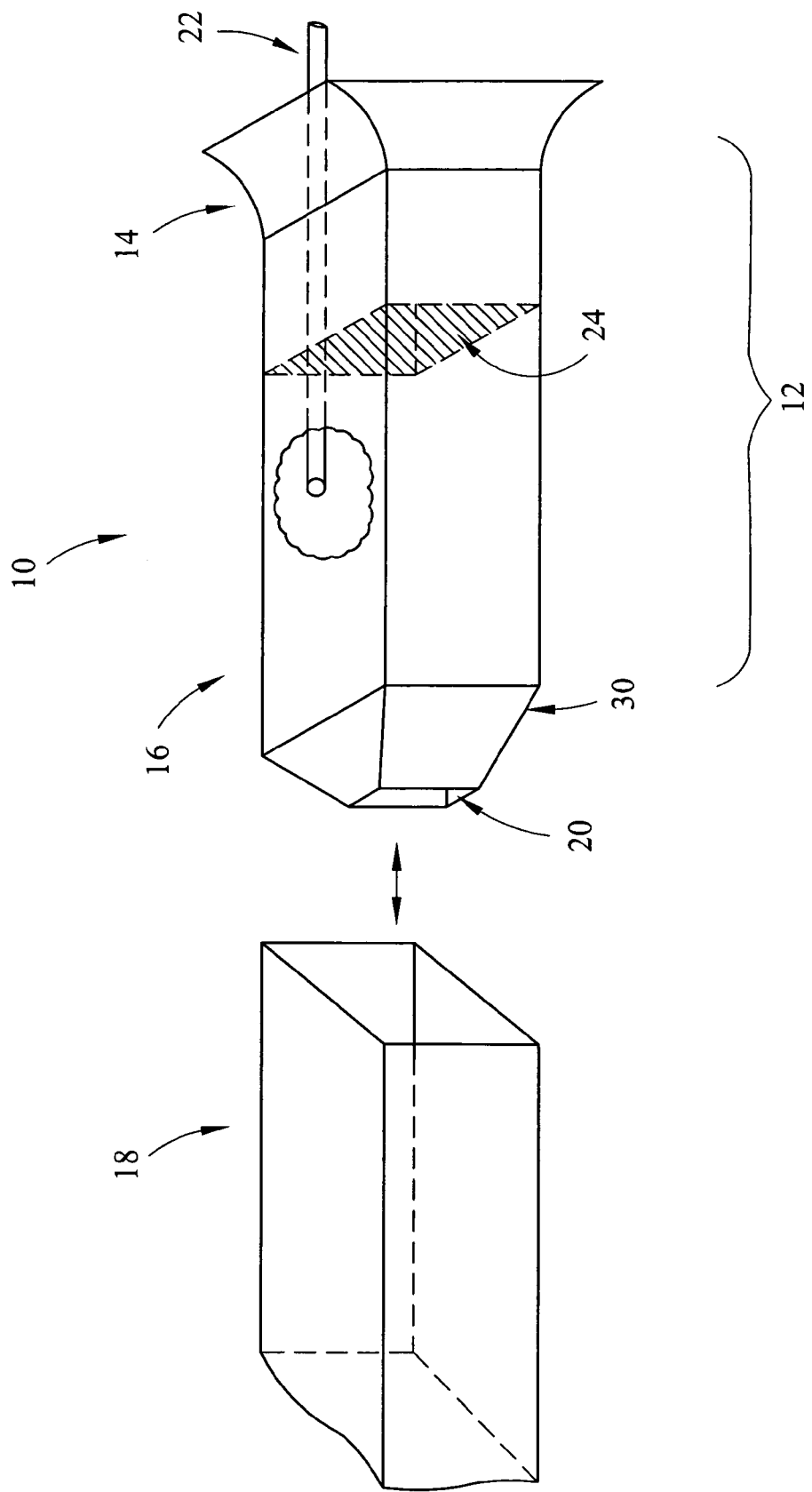
FIG. 5 illustrates a cable protector according to various embodiments.

FIGS. 4a, 4b and 5 illustrate the cable protector 10 according to various embodiments in which the cross-sectional geometry 24 of the axial passageway 20 increases in area through the first end portion 14 in a direction away from the second end portion 16. In FIGS. 4a and 4b, the axial passageway 20 is depicted having a circular cross-sectional geometry 24 as shown in FIGS. 1 and 2. The area of the cross-sectional geometry 24, beginning at that part of the first end portion 14 in closest proximity to the second end portion 16, increases in a non-linear fashion wherein the axial passageway 20 assumes a horn-shaped geometry over the length of the first end portion 14. Alternatively, the area of the cross-sectional geometry 24 may also increase in a linear fashion (not shown) wherein the axial passageway 20 assumes a frustoconical geometry over the length of the first end portion 14. In each of these embodiments, the increasing cross-sectional geometry 24 through the first end portion 14 functions to uniformly guide the cable 22 into raceway member 18 and may be useful where the cable 22 enters the cable protector 10 at a large angle relative to the axial passageway 20. Furthermore, this feature may eliminate the need for a second technician to manually guide the cable 22 into the raceway member 18.

According to the embodiments of FIG. 5, the axial passageway 20 is depicted as having a polygonal cross-sectional geometry 24 as shown in FIG. 3. As with the embodiments illustrated in FIGS. 4a and 4b, the cross-sectional geometry 24 increases in a non-linear fashion wherein the axial passageway 20 through the first end portion 14 assumes a polygonal horn-shaped geometry over the length of the first end portion 14. Alternatively, the area of the cross-sectional geometry 24 may also increase in a linear fashion wherein the axial passageway 20 assumes a pyramidal frustum geometry over the length of the first end portion 14.

Figure 6:
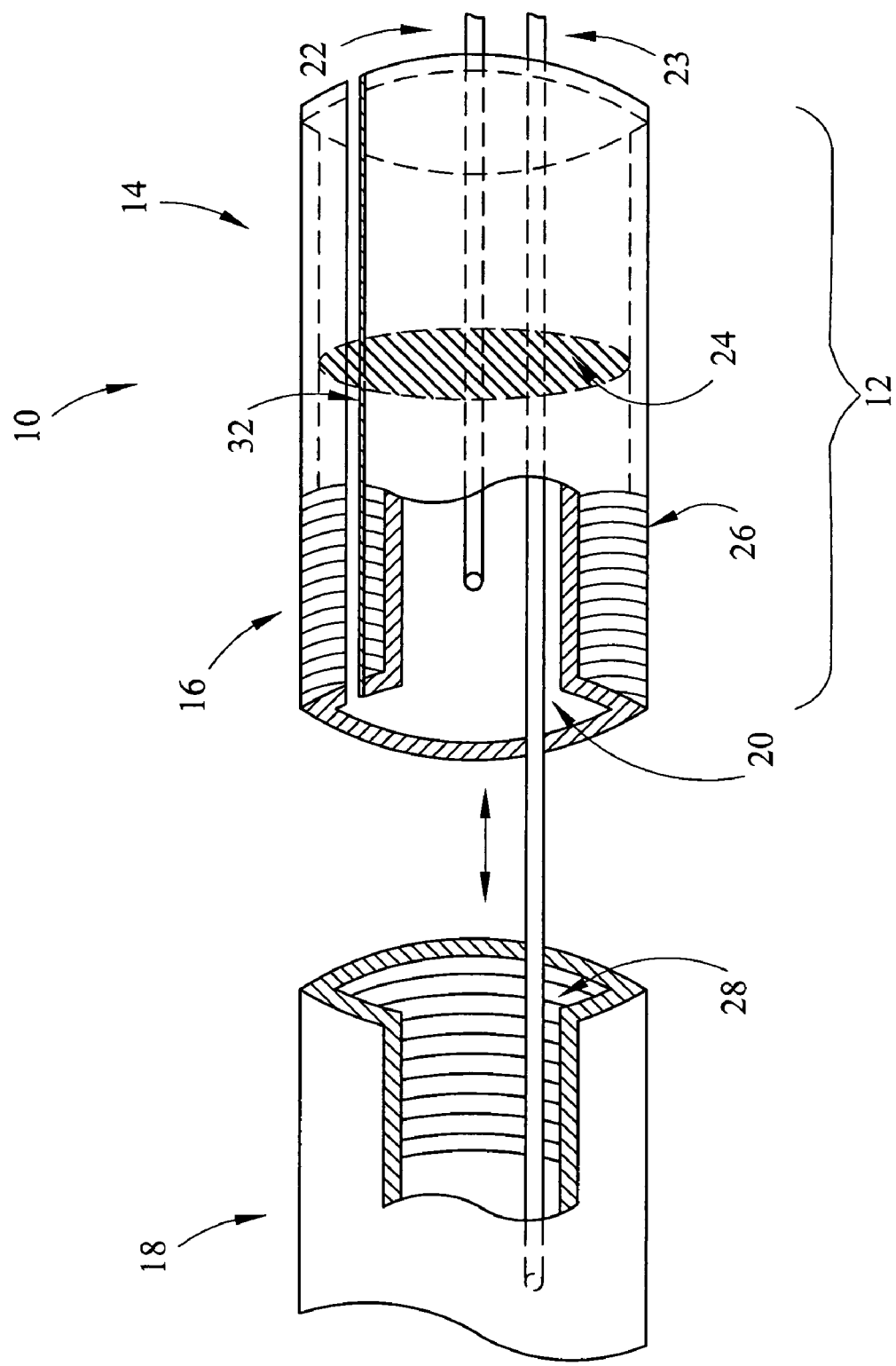
FIG. 6 illustrates a cable protector according to various embodiments.

FIG. 6 depicts various embodiments of the cable protector 10, similar to those of FIG. 1, that may be used when it is necessary to install a cable 22 into a raceway member 18 already having a previously installed cable 23 therein. As shown in FIG. 6, the elongate member 12 further defines an axial slot 32 wherein the previously installed cable 23 is received into the axial passageway 20 by aligning the previously installed cable 23 with the axial slot 32 and inserting it therethrough. Placement of the previously installed cable 23 into the axial passageway 20 in this manner may be necessary prior to removably affixing the cable protector 10 to the raceway member 18 in order to receive the new cable 22.

According to various embodiments, the cable protector 10 may be formed from a plastic using a fabrication technique such as, for example, thermoplastic injection molding. According to other embodiments, the cable protector 10 may be formed from a metal using a fabrication technique, such as, for example metal injection molding (MIM).

According to various embodiments, the cable protector 10 includes a layer of dry film lubricant (not shown) such as, for example, polytetrafluoroethylene (PTFE), applied to the axial passageway 20 of the elongate member 12. The dry film lubricant reduces friction between the cable 22 and the axial passageway 20, thereby reducing the incidence of bare nicks and lessening the tension necessary to pull the cable 22 into the raceway member 18.

For an installation in which a new cable 22 is to be pulled into a raceway member 18 containing no previously installed cables, the technician first removably affixes the cable protector 10 to the raceway member 18 by means of the second end portion 16. Depending upon the particular type of raceway member 18, the second end portion 16 may be threadingly engaged with the raceway member 18 as depicted in FIGS. 1, 4a, and 6, frictionally engaged with the raceway member 18 as shown in FIGS. 2, 3, 4b and 5, or affixed using other engaging means such as, for example, the set-screw 40 as depicted in FIGS. 2 and 4b.

Next, a fish tape is inserted into the raceway member 18 from a location where the new cable 22 is to be routed. The fish tape is continually fed into the raceway member 18 until it passes into the axial passageway 20 of the cable protector 10 and emerges from the first end portion 14 where it is accessed by the technician and fasted to the new cable 22. The new cable 22 is then installed into the raceway member 18 by pulling the fish tape from the raceway member 18 at the location where it was originally inserted. After the new cable 22 has been installed, the cable protector 10 is removed from the raceway member 10 and may be re-used as needed.

In those situations where the new cable 22 is to be installed into a raceway member 18 containing previously installed cables, each of the previously-installed cables are received into the axial passageway 20 of the cable protector 10 by inserting it through the axial slot 32 shown in FIG. 6. This step is necessary prior to removably affixing the cable protector 10 to the raceway member 18. After the new cable 22 has been installed, the cable protector 10 is disengaged from the raceway member 10 and each of the previously installed cables (including the new cable 22, if necessary) is extracted from the axial passageway 20 via the axial slot 32.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. The preceding description, therefore, is not meant to limit the scope of the invention.

What is claimed is:

1. A device, comprising:
an elongate member having a first end portion and a second end portion adjacent to the first end portion, wherein the second end portion is adapted to removably engage a raceway member, the elongate member defining an axial passageway for receiving a cable therethrough, wherein the axial passageway has a pre-determined cross-sectional geometry in a plane perpendicular to the axial passageway, wherein the axial passageway has a coating of a dry film lubricant, wherein the cross-sectional geometry of the axial passageway is circular, wherein the second end portion comprises a first threaded portion and the raceway member comprises a second threaded portion, and wherein the second end portion may threadingly engage the second threaded portion of the raceway member.

2. The device of claim 1, wherein the second end portion further comprises a tapered portion for frictionally engaging the raceway member.

3. The device of claim 1, wherein the elongated member is fabricated from a plastic.

4. The device of claim 1, wherein the elongated member is fabricated from a metal.

5. The device of claim 1, wherein the elongated member further defines an axial slot wherein the cable may be received into the axial passageway by aligning the cable with the axial slot and inserting the cable therethrough.

6. A device, comprising:
an elongate member having a first end portion and a second end portion adjacent to the first end portion, wherein the second end portion is adapted to removably engage a raceway member, the elongate member defining an axial passageway for receiving a cable therethrough, wherein the axial passageway has a pre-determined cross-sectional geometry in a plane perpendicular to the axial passageway, wherein the axial passageway has a coating of a dry film lubricant, wherein the cross-sectional geometry of the axial passageway is polygonal, wherein the second end portion comprises a tapered portion for frictionally engaging the raceway member.

7. The device of claim 6, wherein the elongated member is fabricated from a plastic.

8. The device of claim 6, wherein the elongated member is fabricated from a metal.

9. The device of claim 6, wherein the elongated member further defines an axial slot wherein the cable may be received into the axial passageway by aligning the cable with the axial slot and inserting the cable therethrough.

10. A device, comprising:
an elongate member defining an axial passageway for receiving a cable therethrough, wherein the axial passageway has a pre-determined cross-sectional geometry in a plane perpendicular to the axial passageway and wherein the axial passageway has a coating of a dry film lubricant, the elongate member having a first end portion and a second end portion adjacent to the first end portion, wherein the second end portion is adapted to removeably engage a raceway member, and wherein the cross-sectional geometry of the axial passageway through the first end portion increases non-linearly in area in a direction away from the second end portion.

11. The device of claim 10, wherein the elongate member is fabricated from a plastic.

12. The device of claim 10, wherein the elongate member is fabricated from a metal.

13. The device of claim 10, wherein the elongate member further defines an axial slot whereby the cable may be received into the axial passageway by aligning the cable with the axial slot and inserting the cable therethrough.

14. A device, comprising:

an elongate member defining an axial passageway for receiving a cable therethrough, wherein the axial passageway has a predetermined cross-sectional geometry in a plane perpendicular to the axial passageway and wherein the axial passageway has a coating of a dry film lubricant, the elongate member having a first end portion and a second end portion adjacent to the first end portion, wherein the second end portion is adapted to removeably engage a raceway member, and wherein the cross-sectional geometry of the axial passageway through the first end portion increases non-linearly in area in a direction away from the second end portion, wherein the second end portion comprises a first threaded portion and the raceway member comprises a second threaded portion thereon whereby the second end portion may threadingly engage the second threaded portion of the raceway member.

15. The device of claim 14, wherein the elongated member is fabricated from a plastic.

16. The device of claim 14, wherein the elongated member is fabricated from a metal.

17. The device of claim 14, wherein the elongated member further defines an axial slot wherein the cable may be received into the axial passageway by aligning the cable with the axial slot and inserting the cable therethrough.

18. A device, comprising:

an elongate member defining an axial passageway for receiving a cable therethrough, wherein the axial passageway has a pre-determined cross-sectional geometry in a plane perpendicular to the axial passageway and wherein the axial passageway has a coating of a dry film lubricant, the elongate member having first end portion and a second end portion adjacent to the first end portion, wherein the second end portion is adapted to removeably engage a raceway member, and wherein the cross-sectional geometry of the axial passageway through the first end portion increases non-linearly in area in a direction away from the second end portion, wherein the second end portion comprises a tapered portion for frictionally engaging the raceway member.

19. The device of claim 18, wherein the elongated member is fabricated from a plastic.

20. The device of claim 18, wherein the elongated member is fabricated from a metal.

21. The device of claim 18, wherein the elongated member further defines an axial slot wherein the cable may be received into the axial passageway by aligning the cable with the axial slot and inserting the cable therethrough.

* * * * *